Sept. 17, 1957  L. THORINGTON ET AL  2,806,968
COLOR-CORRECTED LIGHT SOURCE AND PHOSPHOR MIXTURE THEREFOR
Filed Dec. 3, 1953
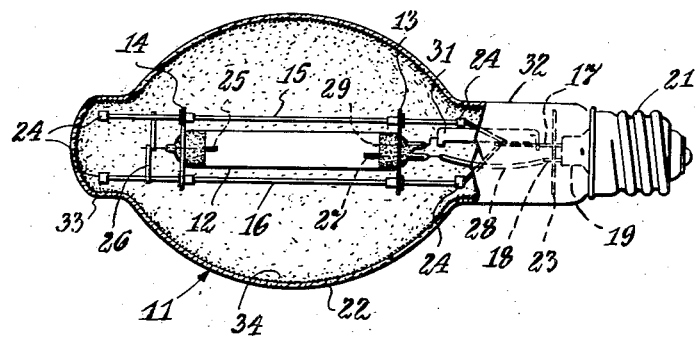
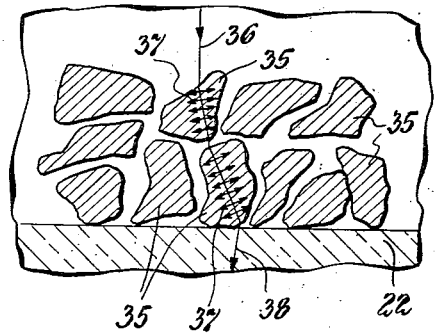
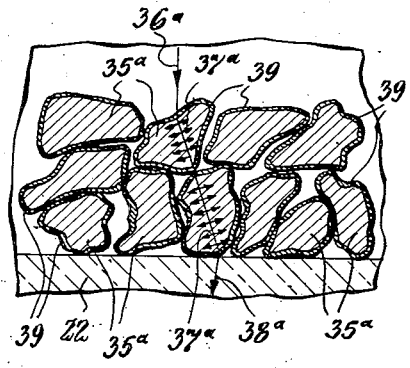
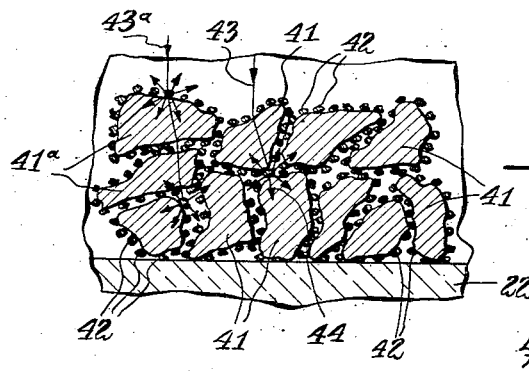
INVENTORS
LUKE THORINGTON,
R. E. PETERSON.
BY
ATTORNEY.

2,806,968
COLOR-CORRECTED LIGHT SOURCE AND PHOSPHOR MIXTURE THEREFOR

Luke Thorington, Glen Gardner, and Robert E. Peterson, Cedar Grove, N. J., assignors to Westinghouse Electric Corporation, East Pittsburgh, Pa., a corporation of Pennsylvania Application December 3, 1953, Serial No. 395,998

3 Claims. (Cl. 313—25)

This invention relates to the color modification of light sources, an example of which is a mercury vapor lamp, and to phosphor mixtures used in effecting this modification.

An object of our invention, generally considered, is to employ with a phosphor a certain proportion of finely-divided silica in order to make more effective use of the ultra-violet radiations which impinge on the phosphor to generate visible light.

Another object of our invention is to improve the effectiveness of a phosphor by admixing fine-particle silica therewith, thereby not only increasing the diffusing characteristics of the coating, but improving the overall color of the source by making the emitted light whiter.

A further object of our invention is to economize in the amount of phosphor needed, by diluting it with silica of such small particle size that its average diameter is no longer than the wave length of the visible light to be transmitted, said silica also having such purity that it has high efficiency in transmitting both visible and ultra-violet radiations, whereby there is a saving in the amount of phosphor needed because it is used more effectively due to multiple scattering and redirecting of the exciting ultra-violet radiations through the phosphor by the silica.

A still further object of our invention is to provide, in combination with a high-pressure mercury vapor lamp or other source of visible and ultra-violet radiations, an enclosing envelope, and a coating on the inner surface of said envelope of a phosphor mixture capable of efficiently adding red light to radiations emitted by the source.

Other objects and advantages of the invention will become apparent as the description proceeds.

Referring to the drawing:

Fig. 1 is a side elevational view, with parts in axial section, of a lamp embodying our invention.

Fig. 2 is a diagram showing a normal phosphor coating and how some ultra-violet radiations are wasted by reason of not being completely absorbed during passage through the coating.

Fig. 3 is a similar diagram showing a coating, as in Fig. 2, but with each phosphor crystal encased in a thin clear film of silica.

Fig. 4 is a similar diagram, but showing a mechanical mixture of the phosphor and fine silica particles which scatter ultra-violet radiations from the arc tube or other source.

Lamps of one type to which our invention relates have already been used with a phosphor coating on the inner surface of the outer envelope thereof, as described and claimed in the Thorington application, Ser. No. 126,506, filed November 10, 1949, now Patent No. 2,748,303, and owned by the assignee of the present application. In accordance with said application, the ultra-violet radiations from the source are changed to visible radiations, especially those in the red region of the spectrum, thereby modifying or correcting the bluish light emitted by the mercury vapor lamp by making it whiter by the addition of red light thereto.

In accordance with the invention of said Thorington application, the coating of phosphor, which is desirably magnesium fluorogermanate, serves two important purposes:

1. It supplies red light to supplement the normal mercury radiation which is red deficient.

2. It diffuses the light from the arc tube so as to produce a more uniform surface brightness of the lamp, as is accomplished by inside frosting in an incandescent lamp.

The first purpose is admirably served by the phosphor. However, the second needs improving because when one views such a burning lamp, the outline of the bright arc tube can be seen. Even inside frosting upon which the phosphor is coated, as described and claimed in the Beggs application, Ser. No. 279,193, filed March 28, 1952, and owned by the assignee of the present application, now abandoned, fails to accomplish the desired end.

We have found that the mechanical admixture of fine-particle silica with a phosphor, examples of which are disclosed in the Thorington application above referred to, not only improves the diffusing characteristics to the coating to the desired degree, but also very materially improves the overall color of the source, making it whiter as contrasted with the color from the lamp of the Thorington application referred to which has a slight yellow-green cast. Last but not least, is the very-considerable saving in the amount of the expensive germanate phosphor which is preferably used, there being a 30%–40% possible reduction in the amount of phosphor needed to obtain the same degree of color correction, as when using such phosphor unadmixed with silica in accordance with said Thorington application.

For example, in accordance with the Thorington application, 0.8 gram of the fluorogermanate phosphor may be used in a 400 watt high-pressure mercury vapor lamp of the so-called JH–1 type, illustrated in Fig. 1. The same lamp coated with about 1 gram of a 50–50 mixture by weight of silica and the same phosphor shows more uniform bulb brightness and whiter color for the same luminous efficiency and percent of added red light. The explanation, for obtaining the same percentage of red while using less phosphor, lies in the fact that the phosphor-ultra-violet combination is used more efficiently due to the multiple scattering and redirecting of the ultra-violet radiation through the phosphor by the silica.

Although we are not limited in the composition of phosphor which we employ admixed with finely-divided silica, yet we may use a phosphor such as described in the Williams Patent No. 2,447,448, dated August 17, 1948, but preferably one such as described and claimed in the Thorington application referred to, one example in molar proportions being:

3.5 MgO
.5 BeO (one specific example of a substitution for MgO)
1.0 $GeO_2$
.01 Mn From such a phosphor, red light may be generated in the range between .62 and .68 micron, to supplement the mercury light between .40 and .58 micron, so as to provide what appears to be white light. The magnesium oxide in such a phosphor may vary between 2 and 6 moles, and it is possible to substitute from 1.9 down to .1 mole of beryllia for magnesia without seriously affecting the room-temperature efficiency of the phosphor when excited by ultra-violet radiations. Or beryllum may be substituted for magnesium between 4 mole percent and slightly less than 40 mole percent. The manganese may lie in the range between and including .001 and .1 mole.

As also disclosed in the Thorington application, additional or alternative small substitutions of fluorine for oxygen, between 0.1 and 2 moles, but to not more than twice the amount of oxygen remaining, have an effect on temperature stability apparently similar to that of beryllia alone, and this is in addition to its beneficial action as a flux in the preparation of the phosphor. The use of florine is of special value in view of the reported toxicity of berylium compounds.

Instead of merely substituting florine instead of beryllium, we may substitute fluorine in addition to beryllium to provide a magnesium-beryllium fluorogermanate. An example of such is represented by the formula

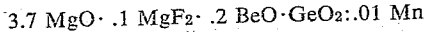

3.7 MgO· .1 MgF$_2$· .2 BeO·GeO$_2$:.01 Mn

Besides this, as disclosed in said Thorington application, ½ mole of zinc has also been substituted for part of the magnesium, as described and illustrated in Fig. 13 thereof.

Referring to the drawing in detail, like parts being designated by like reference characters, there is shown in Fig. 1 a color-corrected high-pressure mercury vapor lamp 11, comprising a quartz inner enevelope 12, the ends of which are supported by mica plates 13 and 14, through which pass supporting wires 15 and 16, welded to a lead 17 projecting from the press 19, adjacent the base 21 of the translucent outer bulb 22.

A mica disk 23, supported in the neck portion 32 on the leads 17 and 18, serves to protect the press from the heat of operation. The lamp 11 may have a main electrode 25 at its outer end connected to support wires 15 and 16 by a lead 26, and a main electrode 27 at its inner end connected to lead 18 by a flexible conductor 28. A starting electrode 29 may be provided, connected through a resistor 31 to lead 17. The envelope 12 encloses a quantity of mercury and inert gas at a pressure above atmospheric, as is usual in lamps of this character.

The outer envelope of the present embodiment is one adapting the lamp for horizontal operation, and so is generally ellipsoidal with its long axis coinciding with that of the lamp 11, so that it will operate as near isothermally as possible. The end portion 33, however, opposite the base 21, as well as the neck portion 32, are formed generally cylindrical about the axis of the envelope 12 and of a relatively smaller diameter, so as to be engaged by spring fingers 24 on the supporting wires 15 and 16 for positioning said envelope 12 in the outer envelope 22. The space between the envelopes 12 and 22 is desirably evacuated. The inner surface of at least the ellipsoidal portion of the outer envelope 22, is coated with a selected color-correcting phosphor admixed with a substantial proportion of finely-divided silica. The inner surface of said envelope 22 may be frosted prior to coating with phosphor mixture, if desired. For an approximate optimum operating temperature of the phosphor mixture 34 (about 350° C. or between 150° C. and 400° C.), assuming the preferred magnesium fluorogermanate admixed with finely divided silica, the length of the ellipsoidal portion of the bulb 22 when enclosing a 400 watt lamp is about 8″, and its maximum transverse dimension is about 6″.

The silica which we prefer to mix with our phosphor is desirably not only finely-divided by amorphous, as produced by burning silicon compounds whose molecules contain no atoms other than silicon, carbon, hydrogen and oxygen. Preferred mixtures for producing such silica are ethyl orthosilicate, (C$_2$H$_2$)$_4$SiO$_4$, silicomethane, silicoethane, other compounds in that series, methyl silicane, ethyl silicane, other such compounds, and the like. However, it is advisable not to use materials which contain too much organic matter, to thereby avoid contamination with free carbon.

In connection with the particle size of the silica, it has been found that optimum light diffusion, with minimum or negligible absorption, is obtainable when using particles the dimension or diameter of which is a fraction of a micron, and preferably wherein the average diameter of the particles, as defined in the Pipkin Patent No. 2,545,896, dated March 20, 1951, is in the range of ⅕ to ⅗ micron. The individual particles range in size from about .9 micron to 30 A. U. and less. In other words, the kind of silica particles preferred to be admixed with the luminescent powder of phosphor in accordance with our invention, is such as used for coating the interior of lamp bulbs, as described in said Pipkin patent.

Referring now to Fig. 2, there is shown diagrammatically, and very much enlarged, particles or crystals 35 of a selected phosphor, which may be magnesium fluorogermanate, as described and claimed in the Thorington application before referred to, applied as a coating on the inner surface of the outer envelope 22 of the lamp 11. The reference character 36 represents an ultra-violet ray impinging on one of the phosphor particles 35, passing through it and the adjacent particle 35, generating luminescence represented by the arrows 37 on its way through, and finally in part passing out of the envelope, as indicated by the reference character 38. In other words, the part which passes through the phosphor particles without being changed into visible light is wasted, because it is either absorbed by the glass of the envelope 22 or passes therethrough without being useful because invisible.

Fig. 3 is a similar diagram representing the effect when the phosphor particles 35$^a$ are as in Fig. 2, except that each particle has a coating 39 of a thin clear film of silica as has been suggested previously, see the Beese Patent No. 2,151,496, dated March 21, 1939. As in the embodiment of Fig. 2, however, an ultra-violet ray 36$^a$ in passing through particles 35$^a$, does so as in Fig. 2 with the generation of visible light 37$^a$, but some of this ray passes into the glass of the envelope 22 and is either absorbed or in part passes therethrough, as represented by the reference character 38$^a$, and is to this extent wasted.

In contrast with the embodiment of Figs. 2 and 3, in the embodiment of Fig. 4, the particles of phosphor 41 are admixed with small particles 42 of silica, as previously described. An ultra-violet ray 43 in passing through a particle of phosphor 41, on emerging does not pass directly to the adjacent particle 41, as in the preceding embodiments, but is scattered by an intervening particle 42 of silica, as represented by the arrows 44, whereby it does not pass directly through the coating on the envelope 22, but instead is redirected and scattered to be efficiently used over and over again in the generation of visible light in phosphor particles, so that all or practically all of the ultra-violet radiation never gets to the envelope 22, as such, but only after conversion into useful visible light. Another ultra-violet ray 43$^a$ may strike a particle 42 of silica before it strikes a particle of phosphor, be scattered in part, and part continue through a phosphor particle or particles 41$^a$, generating visible light, with the remainder being scattered by another particle of silica.

It will, therefore, be seen that in accordance with our invention we propose by using finely divided silica to:

(1) Not only scatter visible radiation from the discharge and the phosphor so as to produce a more uniform bulb brightness but also;

(2) Scatter with minimum attenuation the ultra-violet radiation from the discharge, thereby causing such radiation to traverse the relatively-large phosphor crystals or particles many more times than if the silica were absent, and resulting in a more efficient use of the ultra-violet radiations and of the phosphor.

The requirement for the silica is that it must be extremely fine in order to approximate in size the wave length of the light being produced, and of high purity so that its transmission for both ultra-violet and visible radiations is high. Although we mentioned as preferring amorphous silica, yet we do not wish to be limited to this as finely-divided crystalline silica may be used. Although we have mentioned, as an example, a desirable 50–50 mixture of phosphor and silica particles, yet this is only illustrative and other mixtures may be employed, preferably within the range of from 10% to 80% of silica to 90% to 20% of phosphor, applied from 10–13 milligrams per square inch.

Although we have shown our invention embodied in a high-pressure mercury vapor lamp enclosed in an outer envelope, yet we do not wish to be limited to either the particular form of mercury vapor lamp illustrated, or to such a lamp, as the other forms of lamps, including incandescent lamps, may also effectively make use of phosphor mixtures embodying our invention. See the other lamps of the referred to Thorington case.

Although preferred embodiments have been described, it may be understood that modifications may be made within the spirit and scope of the invention.

We claim:

1. A high-pressure mercury-vapor source of visible and ultraviolet radiations, a light-transmitting envelope surrounding said source, and a coating on the inner surface of said envelope comprising a phosphor having admixed therewith a substantial proportion of finely-divided silica, said silica having an average particle diameter no greater than the wave length of visible light to be transmitted, and said silica having a high efficiency in transmitting both visible and ultraviolet radiations.

2. A high-pressure mercury-vapor source of visible and ultraviolet radiations, a light-transmitting envelope surrounding said source, and a coating on the inner surface of said envelope comprising a phosphor having admixed therewith an approximately equal proportion of finely-divided silica, said silica having an average particle diameter no greater than the wave length of visible light to be transmitted, and said silica having a high efficiency in transmitting both visible and ultraviolet radiations.

3. A high-pressure mercury-vapor source of visible and ultraviolet radiations, a light-transmitting envelope surrounding said source, and a coating on the inner surface of said envelope comprising a manganese-activated magnesium fluorogermanate phosphor having admixed therewith a substantial proportion of finely-divided silica, said silica having an average particle diameter no greater than the wave length of visible light to be transmitted, and said silica having a high efficiency in transmitting both visible and ultraviolet radiations.

References Cited in the file of this patent

UNITED STATES PATENTS

| | | |
|---|---|---|
| 2,177,755 | Uyterhoeven | Oct. 31, 1939 |
| 2,329,632 | Marsden | Sept. 14, 1943 |
| 2,393,305 | Beese | Jan. 8, 1946 |
| 2,748,303 | Thorington | May 29, 1956 |